Figure 1:
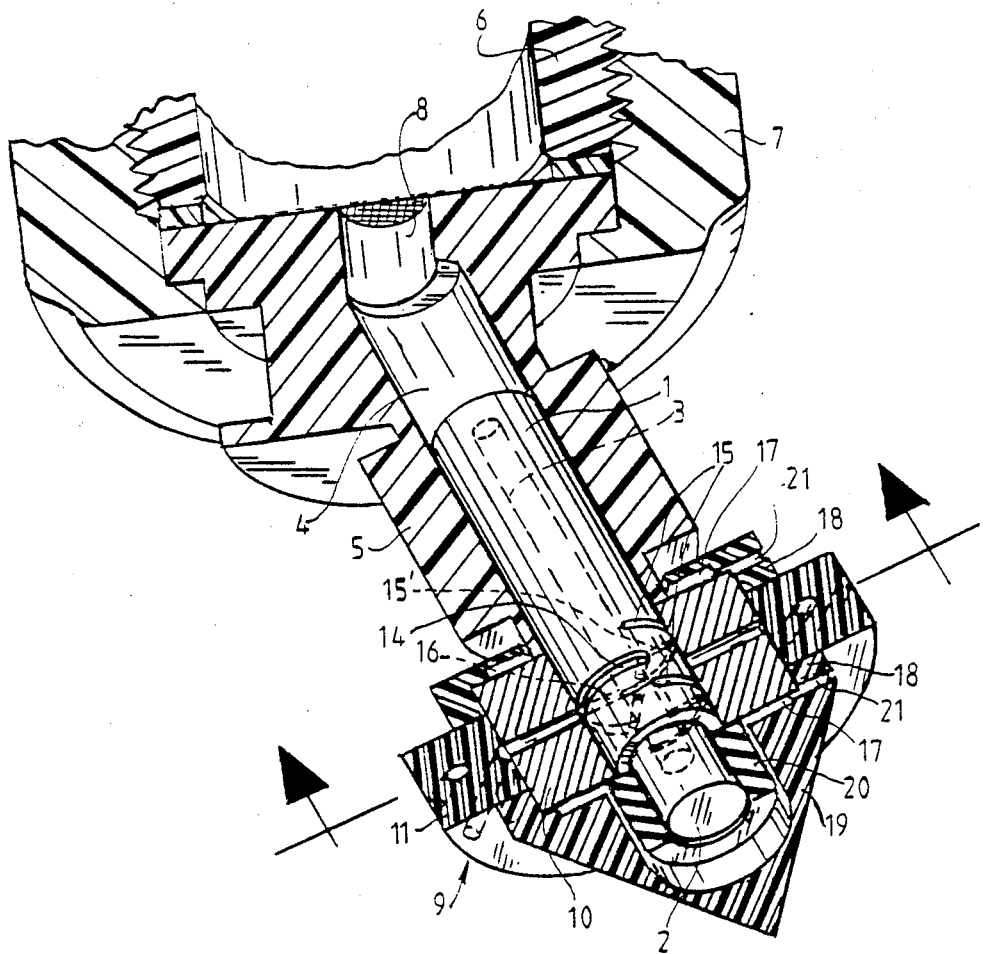

United States Patent [19]

Genbrugge

[11] Patent Number: 4,718,606
[45] Date of Patent: Jan. 12, 1988

[54] METHOD AND DEVICE FOR AGRICULTURAL CROP SPRAYING

[75] Inventor: Jean Genbrugge, Broechem, Belgium

[73] Assignee: Multinorm BV, Niew-Vennep, Netherlands

[21] Appl. No.: 773,788

[22] Filed: Sep. 9, 1985

[30] Foreign Application Priority Data

Sep. 11, 1984 [NL] Netherlands ............... 8402774

[51] Int. Cl.$^4$ ............... B05B 3/06; B05B 1/28; B05B 3/04
[52] U.S. Cl. ............... 239/251; 239/103; 239/122
[58] Field of Search ............... 239/103, 104, 7, 99, 239/122, 222, 222.11, 222.17, 222.19, 251, DIG. 7

[56] References Cited

U.S. PATENT DOCUMENTS

| 7482 | 3/1833 | Walker | 239/251 |
| 1,785,821 | 12/1930 | Snow | 239/251 X |
| 2,408,511 | 10/1946 | Gothard | 239/222.19 |

FOREIGN PATENT DOCUMENTS

| 2209998 | 2/1972 | Fed. Rep. of Germany | 239/222 |
| 2534884 | 5/1975 | Fed. Rep. of Germany | . |
| 1564700 | 4/1980 | United Kingdom | 239/222 |

*Primary Examiner*—Andres Kashnikov
*Assistant Examiner*—Patrick N. Burkhart
*Attorney, Agent, or Firm*—John P. Snyder

[57] ABSTRACT

A method and device for spraying agricultural crops where a liquid, for example a fungi-insecticide, growth regulating substance or fertilizer, is atomized in a conical or flat spray plane (24), wherein the spray mantle (24) is partially interrupted so obtaining an asymmetrical spray picture whereby an accurate and even concentration can be achieved. An atomizing body (9) is rotatabe around a stationary part (1) formed as a hollow cylinder, whereby a groove (14) connecting with the cylinder space (3) is formed in the surface of the cylinder (1) over a circumferential portion, onto which ducts (12, 13) are arranged in the rotation atomizing body (9) in each case connect resulting in that a very even cone mantle with a vertical angle of 150° can be achieved so that the atomized liquid strikes the field produce on the underside of the leaves.

7 Claims, 6 Drawing Figures

METHOD AND DEVICE FOR AGRICULTURAL CROP SPRAYING

The invention relates to a method for spraying agricultural crops where a liquid, for example a fungi-insecticide, growth regulating substance or fertilizer, is atomized in a conical or flat spray plane.

The drawback of conventional spray methods where a conical spraying takes place is that the distribution of the atomized liquid is uneven, especially if the atomizing is carried out with the aid of a vehicle that is movable through a field. It has been found that with this method greater localised concentrations occur which can result in the burning of the plant.

The invention has for its object to overcome the above mentioned drawback and provides for this purpose a method which is distinct in that the spray mantle is partially interrupted. An asymmetrical spray picture is in this way obtained, whereby an accurate and even concentration can be achieved.

The method can be applied particularly advantageously in the spraying of the liquid by means of multiple spray mantles arranged next to one another. According to the invention said spray mantles are arranged next to one another such that an unbroken line of intersection with an imaginary plane results, which line must be viewed as the "line of spray".

In addition the invention relates to a spray device for carrying out the above described method, said spray device consisting generally of a supported atomizing body rotatable around a stationary part. According to the invention, said stationary part is formed as a hollow cylinder, whereby a groove connecting with the cylinder space is formed in the surface of the cylinder over a circumferential portion, onto which ducts arranged in the rotating atomizing body in each case connect. Because said ducts are then fed only if they are situated opposite said groove, said ducts will therefore only atomize liquid over a part of the rotating movement. The added advantage results that a very even cone mantle with a vertical angle of 150° can be achieved so that the atomized liquid strikes the field produce on the underside of the leaves.

Figure 2:
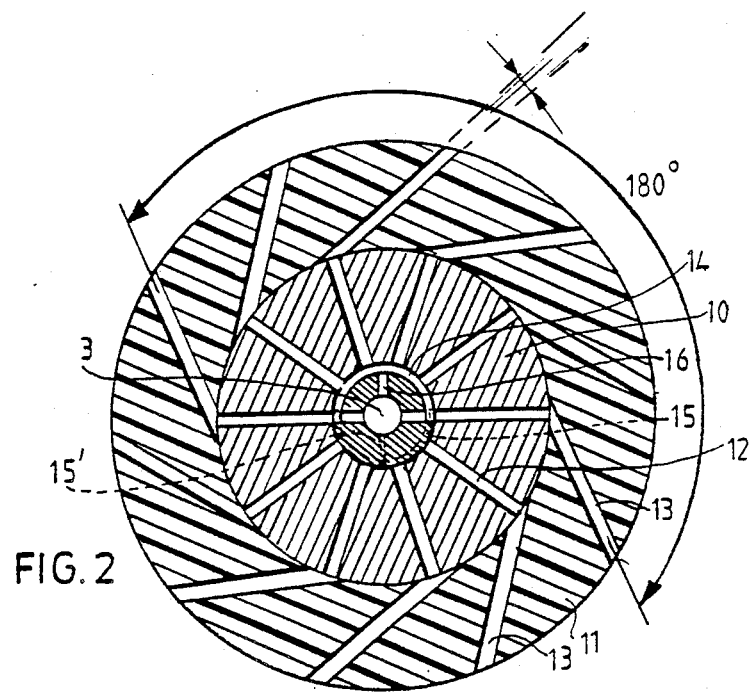
Figure 3:
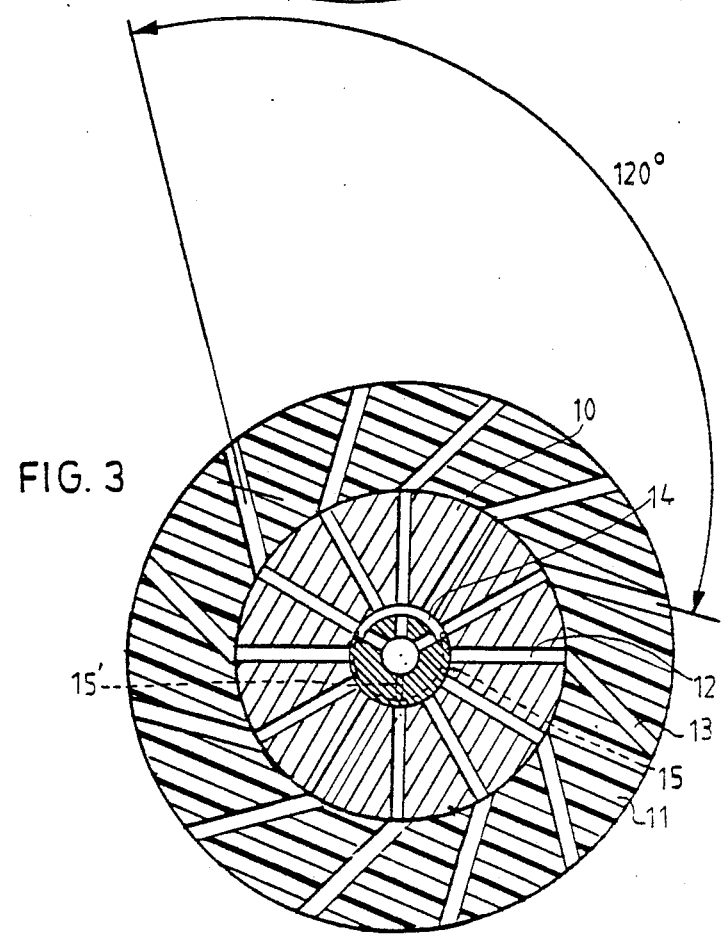

In an embodiment, the rotatable atomizing body is formed from a first disc-shaped element having radially directed ducts, and a second disc-shaped element arranged firmly around it having ducts connecting in each case at an angle onto a duct of said first element. The rotary movement of the atomizing body results because of this angle position, while the radially directed ducts in the first disc-shaped element assure an accurate connection onto the groove in the stationary part and therefore an accurate beginning and end of the spray cone.

In order to prevent drop formation of the liquid to be atomized as a result of leakage symptoms, the disc-shaped element is provided on both sides with a receiving chamber, which has one or more outlet openings directed radially to the outside. In this way liquid which for example leaks out along the surfaces of contact between the stationary and rotatable parts can be intercepted in the chamber, which, as a result of the rotating movement throws the liquid outside via the outlet openings and in this way sprays it.

In addition the invention relates to a spray boom carried by a vehicle, said boom having more than one of the above described spray devices. Said spray devices are set up preferably in an inclined position in order to obtain a line of spray as straight as possible. It can be advantageous here to position the spray devices inclined alternately forwards and backwards.

The invention is further explained on the basis of the following description of an embodiment using figures.

In the drawing:

FIG. 1 shows a perspective bottom view of a spray device, which is a cut through axially, FIGS. 2 and 3 each show a section along the line II—II from FIG. 1 of two embodiments, FIG. 4 shows a perspective rear view of a spray boom that is movable over a field and provided with spray devices according to the foregoing figures, FIG. 5 shows a line of spray obtained with the spray device from FIG. 4, FIG. 6 shows a perspective bottom view of a spray device from the spray boom in FIG. 4 with the associated spray cone.

The spray device shown in FIG. 1 consists of a hollow cylindrical stationary part 1 which is closed off at its bottom end 2, so that the space 3 in said cylindrical part can only be fed with the liquid to be atomized from the open upper side. Said stationary part 1 is accomodated close fitting in a borehole 4 of a holder 5. Said holder 5 can be of arbitrary form, this form falling outside the scope of the invention. The top part of the holder 5 is attached close fitting onto a bracket 6, see also FIG. 6, by means of a screw cap 7. The borehole 4 has an open connection via a connecting duct 8 with a space in said bracket 6, which can be fed for example through a joint feed conduit or spray boom.

The atomizing body 9 is supported rotatably on the end of the hollow cylinder 1 projecting outside the holder 5. Said body consists of a first disc 10 situated inside and a second disc 11 firmly coupled with the outer circumference of said disc 10. FIGS. 2 and 3 show that said first shaped part is made in the form of radially directed ducts 12 onto which in each case a duct 13 of the outer disc 11 connects at an angled position thereto.

Said ducts 12, 13 lie roughly in the central plane of the two discs, said plane running through a circumferential groove 14 arranged in the stationary connecting part 1. Said circumferential groove extends over a part of the circumference, for example in FIG. 2 over 180° and in FIG. 3 over 120°. On the opposite side portion of the cylinder 1 two discharge grooves 15 are arranged on either side of said groove 14. The width of the groove 15 is roughly half that of the groove 14, so that together an equal width is obtained over the full circumference of the cylindrical part 1. Groove 14 connects via duct 16 with the hollow space 3 in the cylinder, while grooves 15 with duct 15' are likewise each connected with said space 3. The discharge grooves 15 can also be arranged in the rotating part at 160°.

On the upper and lower side of the first disc 10 situated inside, a receiving chamber 17 is formed by a ring part 18 firmly attached to the discs, which part forms on the underside a hole with a cap 19 which extends over a washer 20 attached firmly on the bottom end 2 of the hollow cylinder 1. Said washer 20 serves to lock the atomizing body 9 axially.

Each ring-shaped part 18 is formed with one or more radially directed outlet openings 21 which connect with the receiving chamber 17.

The operation of the above described device is as follows:

By feeding liquid under pressure via the connecting duct 8, the space 4 and the space 3, liquid will arrive via duct 16 in the circumferential groove 14. Said liquid runs via the ducts 12 connecting with said circumferential groove 14 and subsequently to the ducts 13. As a result of the angle positions of said ducts 13, the atomizing body 9 will begin to rotate around the stationary part 1. Each duct therefore throws out liquid in a predetermined arc (180° in FIG. 2 and 120° in FIG. 3) and as a result of the rotating action thereof the liquid atomizes into small drops. At the end of the spray arc the feed from the duct is stopped abruptly as soon as the duct 12 reaches the end of the groove 14, this assuring the radial position of said duct 12.

The pressure prevailing in the groove 14 will apply an uneven pressure on the disc 10, which is compensated by the pressure in the ducts 15'. Any leaking liquid will arrive via the cleft shaped space between the stationary part 1 and the disc 10 at the upper and lower face of said disc 10 so that the liquid can be received in the chamber 17 as a result of the centrifugal action. When there is sufficient liquid it will be thrown out via the opening 21 and therefore not cause leakage. In the same way any liquid received in the cap 19 will be thrown out via the lower chamber 17.

Figure 4:
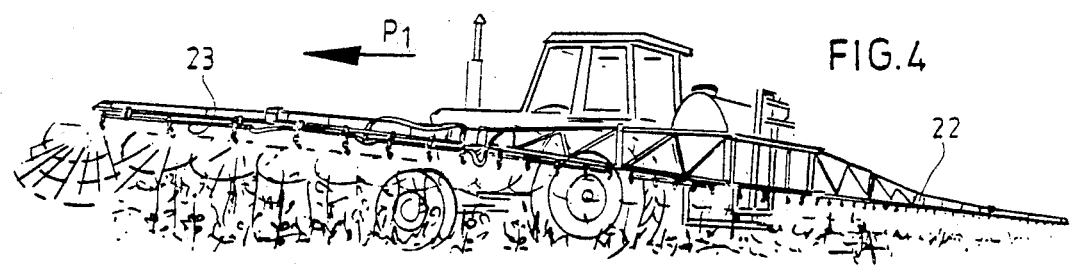
Figure 5:
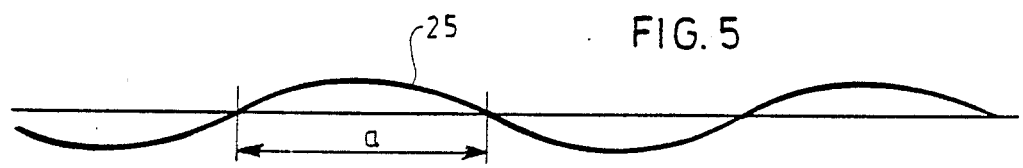
Figure 6:
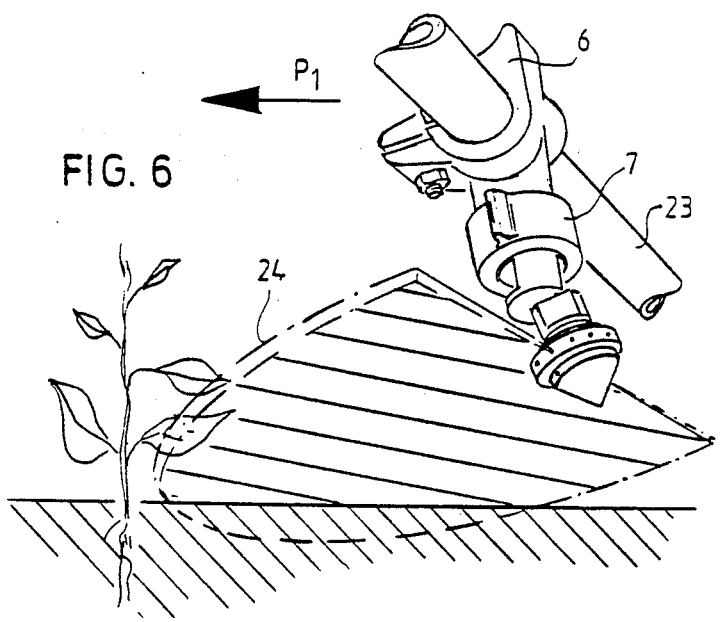

The device from FIG. 1 can be successfully suspended on the spray boom 22, which boom can be of conventional construction. Said spray boom comprises a feed conduit 23 which connects with the space in the bracket 6. In view of the fact that said bracket 6 can be attached on the feed conduit 23 in various positions, preferably a forward inclined or backward inclined position, a spray cone can be formed as illustrated by the line 24 in FIG. 6. Depending on the rotation velocity, pressure of the liquid and type of liquid, a spray cone with varying vertical angles results. With the device shown and described this vertical angle is very large and attains 180°. As a result a very even spray pattern occurs which moreover extends only over a part of the circumference, as described above. Through correct positioning of the groove 14, with respect to the forward driving apparatus P1 in FIGS. 4 and 6, a plant can as a result be sprayed very evenly. The width of the mantle can also be determined by the length of the groove 14, so that for example by placing a spray device inclined alternately forwards and backwards on the spray boom 22 and by positioning the groove 14 inclined alternately forwards and backwards, a spray cone is obtained respectively forwards and backwards, whereby a line of spray 25 in FIG. 5 can be attained. Said line of spray 25 is built up of line portions having the length a which form the line of intersection of the spray cone 24 with an imaginary horizontal plane. Said plane can be the ground or lie at some distance above the field. In this way a connected line of spray 25 occurs which does not create any difference of concentration in the field.

The invention is not limited to the above described embodiment. It will be apparent that by selecting the form of spray cone or the disposition of the spray device on a spray boom, any desired line of spray can be realised.

What is claimed is:

1. In a crop spraying device, the combination of a fixed tubular member including means for supplying crop spraying liquid under pressure into the interior thereof, said tubular member having a circumferentially elongate discharge groove therein which extends only partially around the tubular member in the circumferential direction thereof, a body rotatably journalled on said tubular member, said body having a bore defining a cylindrical surface rotatably embracing that portion of said tubular member having said discharge groove therein so that only a corresponding part-circumferential portion of said surface is opposite said groove at any one time, said body having a series of ducts having inner ends intersecting said surface at circumferentially spaced positions therearound so that not all of said inner ends communicate with said groove at any one time, said ducts being spaced from one another relative to the length of said groove so that a plurality of said inner ends of the ducts are in communication with said groove at all times, said ducts defining outer end discharge channels which extend in directions which are non-radial with respect to the axis of rotation of said body on the tubular member whereby pressure induced flow of the liquid through the ducts which are at any time in communication with the groove imparts rotation to the body on the tubular member.

2. In a crop spraying device, the combination of a fixed tubular member including means for supplying crop spraying liquid under pressure into the interior thereof, said tubular member having a circumferentially elongate discharge groove therein which extends only partially around the tubular member in the circumferential direction thereof, a body rotatably journalled on said tubular member, said body having a bore defining a cylindrical surface rotatably embracing that portion of said tubular member having said discharge groove therein so that only a corresponding part-circumferential portion of said surface is opposite said groove at any one time, said body having a series of ducts having inner ends intersecting said surface at circumferentially spaced positions therearound so that not all of said inner ends communicate with said groove at any one time, said ducts defining outer end discharge channels which extend in directions which are non-radial with respect to the axis of rotation of said body on the tubular member whereby pressure induced flow of the liquid through the ducts which are at any time in communication with the groove imparts rotation to the body on the tubular member, said tubular member being provided with at least one further circumferentially extending groove therein which is located in axially spaced relation to the groove first mentioned at an axial distance therefrom sufficient to remain out of communication with the grooves in any rotatable position of the body on the tubular member, said further groove being in opposition to said surface in circumferentially offset relation to the groove first mentioned so as to exert force on said surface which tends to counterbalance force imposed upon said body by said groove first mentioned.

3. In a crop spraying device as defined in claim 2 wherein said body is provided with further ducts communicating with said surface in axially spaced relation to both of the grooves so as to discharge liquid which may leak through said further groove.

4. A crop spraying device which comprises a boom adapted to be transported by a vehicle over a field while in substantially horizontal position, a plurality of spray nozzles carried by said boom in longitudinally spaced relation therealong, each spray nozzle having a rotatable body and a tubular member receiving crop-treating liquid under pressure and defining an axis about which the body is rotated, said tubular member having a part-circumferential groove therein and each body having a circumferentially spaced series of ducts only some of which communicate with said groove in any rotational position of the body on the tubular member about the axis defined thereby, said ducts being spaced from one another relative to the length of said groove so that a plurality of said ducts are in communication with said groove at all times, said ducts having discharge channels which are angled non-radially with respect to such axis so as to impart rotary motion to the body in response to pressurized crop-treating liquid flowing through said groove and those ducts in communication therewith, and means mounting said tubular members on the boom for individually adjusting the axes defined thereby in selected non-vertical positions.

5. A crop spraying device as defined in claim 4 wherein said discharge channels lie in a plane substantially perpendicular to an associated axis of rotation.

6. A crop spraying device comprising a boom adapted to be transported by a vehicle over a field while in substantially horizontal position, a plurality of spray nozzles carried by said boom in longitudinally spaced relation therealong, each spray nozzle having a rotatable body and a tubular member receiving crop-treating liquid under pressure and defining an axis about which the body is rotated, said tubular member having a part-circumferential groove therein and each body having a circumferentially spaced series of ducts only some of which communicate with said groove in any rotational position of the body on the tubular member about the axis defined thereby, said ducts having discharge channels which are angled non-radially with respect to such axis so as to impart rotary motion to the body in response to pressurized crop-treating liquid flowing through said groove and those ducts in communication therewith, said discharge channels lying in a plane substantially perpendicular to an associated axis of rotation, and means mounting said tubular members on the boom for individually adjusting the axes defined thereby in selected non-vertical positions, each tubular member including a further groove axially spaced from the groove first mentioned and out of communication with the ducts and positioned to counterbalance force imposed upon the associated body by the pressurized crop-treating liquid flowing through the groove first mentioned.

7. A crop spraying device as defined in claim 6 including duct means on each body for spray-discharging crop-treating liquid which leaks past said further groove.

* * * * *